Figure 1:
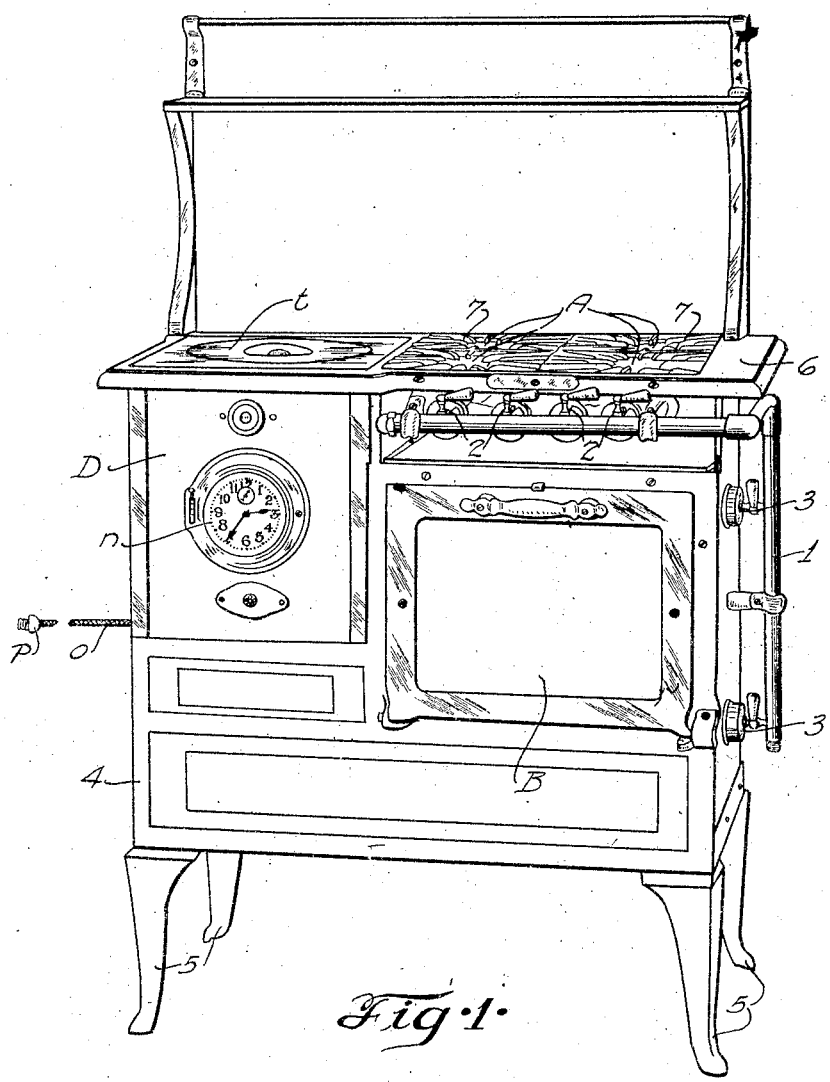

Nov. 27, 1923. 1,475,608

J. T. TEMPLETON

COMBINATION GAS AND ELECTRIC STOVE

Filed Nov. 1, 1922  3 Sheets-Sheet 1

INVENTOR
Jones T. Templeton.
By Bakewell & Church
ATTORNEYS

Nov. 27, 1923. 1,475,608

J. T. TEMPLETON

COMBINATION GAS AND ELECTRIC STOVE

Filed Nov. 1, 1922  3 Sheets-Sheet 3

INVENTOR
Jones T. Templeton.
By Bakewell & Cluck
ATTORNEYS

Patented Nov. 27, 1923.

1,475,608

UNITED STATES PATENT OFFICE.

JONES T. TEMPLETON, OF ST. LOUIS, MISSOURI, ASSIGNOR TO BUCK'S STOVE & RANGE COMPANY, OF ST. LOUIS, MISSOURI, A CORPORATION OF MISSOURI.

COMBINATION GAS AND ELECTRIC STOVE.

Application filed November 1, 1922. Serial No. 598,399.

*To all whom it may concern:*

Be it known that I, JONES T. TEMPLETON, a citizen of the United States, residing at St. Louis, Missouri, have invented a certain new and useful Improvement in Combination Gas and Electric Stoves, of which the following is a full, clear, and exact description, such as will enable others skilled in the art to which it appertains to make and use the same.

This invention relates to cooking stoves.

The main object of my invention is to provide a cooking apparatus that combines in one unitary structure the advantages accruing from the use of gas to cook food and the advantages accruing from the use of electricity to cook food.

Another object is to provide a practicable cooking stove for household use, which, in addition to having the capacity of the conventional gas range, is provided with an electrically-operated means for cooking a complete meal for a family of eight people.

Another object is to provide a combination gas and electric cooking stove that is compact, inexpensive to manufacture, of neat and ornamental appearance and of such construction that the electric unit can be operatively connected with a source of electrical energy by simply screwing the plug of a conventional "lamp cord" into one of the lamp sockets of the dwelling in which the stove is used.

And still another object is to provide a combination gas and electric cooking stove in which the electric unit is arranged in such a relation with the top gas burners of the stove that it can be used for the same purpose as the side shelf which projects laterally from the top of a conventional gas range. Other objects and desirable features of my invention will be hereinafter pointed out.

To this end I have devised a cooking apparatus that comprises a number of open gas burners, hereinafter referred to as top burners, which are adapted to be used for heating the contents of cooking utensils arranged over said burners, a baking oven, gas burners for heating said oven arranged in such a way that they can be also used for broiling food, an electrically-operated means for boiling, roasting, baking or stewing food, and means for supporting and combining said various elements together in such a way as to produce a unitary structure, which, in general appearance, resembles the conventional gas range and takes up practically the same space as the conventional gas range.

It is immaterial, so far as my broad idea is concerned, what particular type or kind of electrically-operated cooking means the apparatus is equipped with, but I prefer to use a means that comprises a plurality of receptacles arranged one above the other in nested relation in a heat insulated jacket that is surrounded by one or more electric heating elements to which electric current is supplied by a conventional "lamp cord" provided with a plug that is adapted to be screwed into one of the lamp sockets of the lighting circuit of the dwelling in which the stove is used. It is also immaterial how the elecrically-operated cooking means, the gas burners and the oven are arranged relatively to each other, but I prefer to arrange the electric unit at one side of the top burners of the stove with the upper end of said unit extending flush, or practically so, with the gratings arranged over said top burners so that said electric unit can be used to perform the function of the laterally-projecting shelf on the top frame member of a conventional gas range. The supporting means for the gas burners, oven and electric unit can be of any preferred construction and design, but I prefer to use a supporting means that comprises a horizontally-disposed top member that has an opening in same which receives and supports the top part of the casing of the electric unit and holds said unit in such a position that the upper end of same will serve as a shelf or sustaining means for cooking utensils or other objects.

Figure 1 of the drawings is a perspective view of a cooking apparatus constructed in accordance with my invention.

Figure 2:
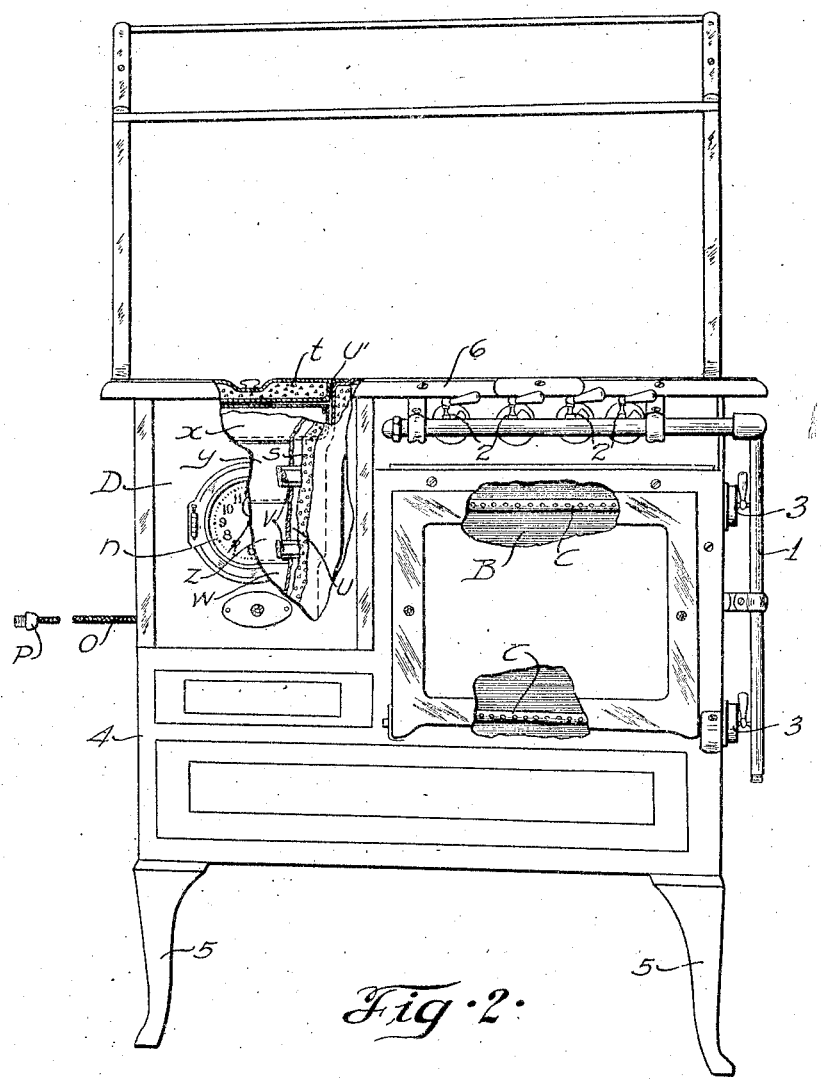
Figure 3:
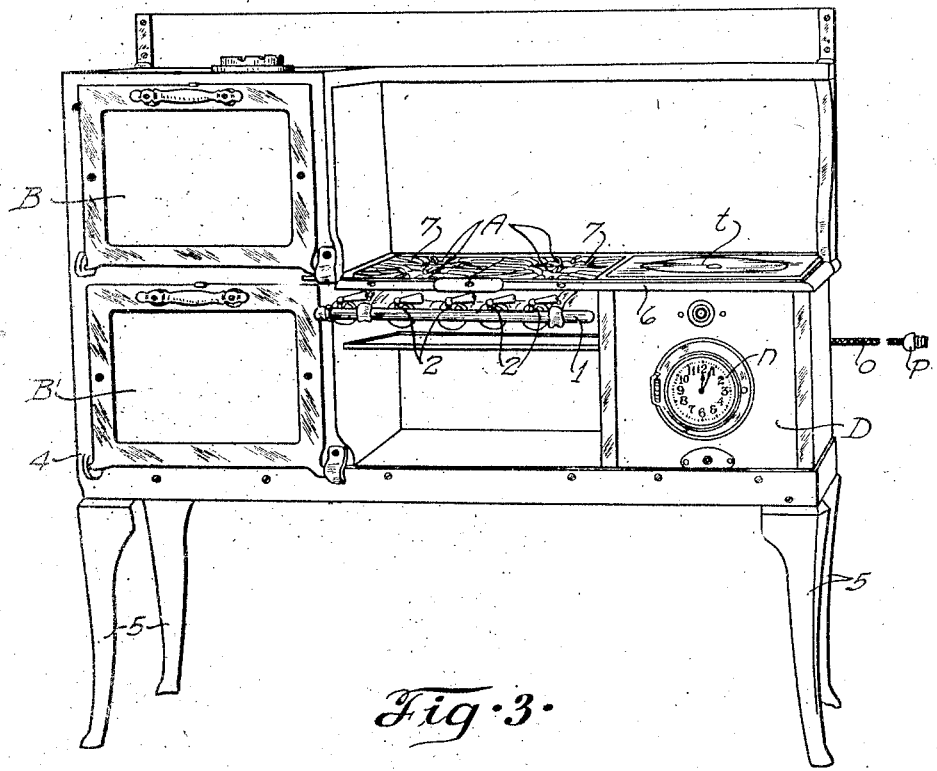

Figure 2 is a front elevational view of the apparatus shown in Figure 1, partly broken away to more clearly illustrate the construction of same; and Figure 3 is a perspective view, illustrating a cooking apparatus embodying my invention, in which the elements are arranged in a slightly different manner than in the apparatus shown in Figure 1, Referring to Figures 1 and 2 of the drawings, A designates a plurality of open burners or top burners such as are used in gas ranges for heating the contents of cooking utensils that are arranged over said burners, 1 designates a pipe for supplying gas to said burners, 2 designates valves for regulating the flow of the gas to the burners A, B designates an oven arranged under the burners A, C designates gas burners that are adapted to be used for heating the oven B and also for broiling food, 3 designates valves for regulating the flow of gas to the burners C, and D designates as an entirety an electric unit arranged at one side of the oven B that is adapted to be used for cooking food in a closed container or containers.

Any suitable means may be used for supporting the various elements above referred to, but I prefer to use a supporting structure that comprises a frame 4 in which said elements are mounted, legs 5 secured to the lower end of said frame and a horizontally-disposed top plate 6 arranged at the upper end of said frame and provided with gratings 7 arranged over the top burners A, the electric unit D being so arranged with relation to said top member 6 that the upper end of said electric unit extends flush, or substantially so, with said top member so that it can be used for the same purpose as the laterally-projecting shelf on the top frame of a conventional gas range, namely, to support or sustain cooking utensils or other articles.

The electric unit D that I prefer to use is preferably constructed in the manner illustrated in Figure 2 of the drawings and is composed of a plurality of containers or receptacles $x$, $y$, $z$ and $w$ arranged one above the other in nested relation in a casing or jacket $u$ surrounded by a plurality of electric heating elements $v$ and encased in an insulating sheathing $s$ of non-heat-conducting material, the casing $u$ being provided at its upper end with a removable cover $t$ that fits in a hole in a horizontally-disposed portion $u'$ of the casing that is supported by and extends substantially flush with the horizontally-disposed top member 6 of the supporting structure for the various elements of the stove. The heating elements $v$ of the electric unit D are energized by electric current that is supplied to same through a conventional lamp cord $o$ provided with a plug $p$ that is adapted to be screwed into one of the lamp sockets of the electric lighting circuit of the dwelling in which the stove is used. If desired, the electric unit D may comprise a clock $n$ for automatically operating a switch (not shown) that controls the circuit used to energize the heating elements $v$, it being possible to set said clock in such a way that it will close the circuit at a certain time, thereby rendering the heating elements operative and will open said circuit automatically after said heating elements have been in operation for a certain period.

A cooking apparatus of the construction above described is a decided improvement on the conventional gas range, in that it comprises as an integral part thereof, a gas-operated means for cooking food by all of the usual cooking methods, namely, boiling, stewing, baking, frying or broiling, and an electrically-operated means for cooking a complete meal for a family of eight people, said means being arranged so that they both can be operated at the same time, one can be operated independently of the other, or one can be operated to partly cook the food and the other used to complete the cooking operation. The apparatus is compact and takes up practically no more space than the conventional gas range, due to the fact that the electric unit D is so arranged with relation to the top burners A of the stove that it can be used to perform the function of the side shelf on the top frame member of a conventional gas range. The apparatus is of such simple design that it can be manufactured at a sufficiently low cost to bring it within the financial reach of the average family, and another very desirable feature of said apparatus is that the electric unit of same can be operatively connected with an electric supply circuit by simply screwing the plug $p$ into one of the lamp sockets of the dwelling in which the apparatus is used. thereby overcoming the necessity of providing special wiring.

In Figure 3 of the drawings I have illustrated an apparatus embodying my invention which is of the same general construction as the apparatus shown in Figure 1, except that a baking oven B and a broiling oven B' are arranged in superimposed relation at one side of the top gas burners A, the electric unit D being arranged at the other side of said top burners and so disposed with relation to same that the upper end of said unit can be used as a shelf or supporting surface for cooking utensils or other articles.

Having thus described my invention, what I claim as new and desire to secure by Letters Patent is:

1. A combination gas and electric stove, comprising a gas-operated means consisting of open gas burners and oven burners for cooking food by the usual cooking methods, an electric unit composed of a plurality of food containers arranged in a heat insulated casing and an electric heating element surrounding said casing, and a supporting means with which said gas-operated means and said electric unit are combined in such a way as to form a unitary structure.

2. A combination gas and electric cooking stove, comprising top burners or open burners over which cooking utensils are adapted to be arranged, an electric unit comprising a plurality of food containers arranged in nested relation and an electrically-operated means for heating said containers, and a supporting means for said burners and electric unit comprising a horizontally-disposed top member in which said electric unit is mounted in such a way that the upper end of same extends substantially flush with said member whereby it may be used as a shelf or supporting surface for cooking utensils and other articles.

3. A combination gas and electric cooking stove, comprising open gas burners or top burners, an oven equipped with gas burners, a supporting structure for said elements comprising a horizontally-disposed top member provided with means for sustaining cooking utensils that are arranged above said top burners, and an electric cooking unit mounted in said supporting structure at one side of said top burners, and composed of a casing, an electric heating element surrounding said casing, and a plurality of food containers arranged inside of said casing in superimposed relation.

4. A combination gas and electric cooking stove, comprising open gas burners or top burners, an oven equipped with gas burners, a supporting structure for said elements comprising a horizontally-disposed top member provided with means for sustaining cooking utensils that are arranged above said top burners, an electric cooking unit carried by said supporting structure and arranged at one side of said top burners, said electric unit comprising an electrically-heated casing, removable food containers in said casing, and a removable closure for said casing arranged flush or substantially so with the horizontally-disposed top member of said supporting structure.

JONES T. TEMPLETON.